United States Patent
Liu et al.

(10) Patent No.: US 10,674,386 B2
(45) Date of Patent: Jun. 2, 2020

(54) NETWORK OUT-OF-SYNCHRONIZATION STATE PROCESSING METHOD AND APPARATUS, AND NETWORK ACCESS METHOD AND APPARATUS

(71) Applicant: Huawei Technologies Co., Ltd., Shenzhen (CN)

(72) Inventors: Yalin Liu, Shenzhen (CN); Sainan Li, Chengdu (CN); Yong Xie, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/110,906

(22) Filed: Aug. 23, 2018

(65) Prior Publication Data

US 2018/0368014 A1 Dec. 20, 2018

Related U.S. Application Data

(63) Continuation of application No. PCT/CN2016/113949, filed on Dec. 30, 2016.

(30) Foreign Application Priority Data

Mar. 16, 2016 (CN) .......................... 2016 1 0158379

(51) Int. Cl.
*H04W 24/08* (2009.01)
*H04W 76/19* (2018.01)
(Continued)

(52) U.S. Cl.
CPC ........... *H04W 24/08* (2013.01); *H04W 76/19* (2018.02); *H04W 76/25* (2018.02); *H04W 68/02* (2013.01); *H04W 68/06* (2013.01)

(58) Field of Classification Search
CPC ............ H04W 72/042; H04W 72/0446; H04L 5/0048; H04L 5/0053
See application file for complete search history.

(56) References Cited

U.S. PATENT DOCUMENTS

2010/0279695 A1* 11/2010 Amirijoo .......... H04W 36/0055
455/438
2013/0088960 A1* 4/2013 Bi ........................ H04L 1/1841
370/235
(Continued)

FOREIGN PATENT DOCUMENTS

CN 1863088 A 11/2006
CN 100591160 C 2/2010
(Continued)

OTHER PUBLICATIONS

Mediatek Inc., "Uplink Measurements for NR Mobility," 3GPP TSG-RAN WG2 Meeting #95bis, R2-166094, Kaohsiung, Taiwan, Oct. 10-14, 2016, 5 pages.
(Continued)

*Primary Examiner* — Jung H Park
(74) *Attorney, Agent, or Firm* — Slater Matstil, LLP

(57) ABSTRACT

A network out-of-synchronization state processing method and apparatus, and a network access method and apparatus are provided. The method includes: if a first network device does not receive, in a first time length after the first network device determines that a terminal is in a network out-of-synchronization state, a measurement message reported by a second network device in a signal coverage area of the first network device, instructing at least one second network device in the signal coverage area of the first network device to send paging signaling to the terminal; and setting a network status of the terminal to a detached state if the first network device determines that in a second time length, no second network device in the signal coverage area of the first
(Continued)

network device receives a paging response sent by the terminal, and that the terminal is still in the network out-of-synchronization state.

20 Claims, 5 Drawing Sheets

(51) Int. Cl.
*H04W 76/25* (2018.01)
*H04W 68/06* (2009.01)
*H04W 68/02* (2009.01)

(56) References Cited

U.S. PATENT DOCUMENTS

| | | | |
|---|---|---|---|
| 2013/0088979 A1* | 4/2013 | Bi | H04B 7/024 370/252 |
| 2015/0141002 A1 | 5/2015 | Ma et al. | |
| 2015/0195788 A1 | 7/2015 | Au et al. | |
| 2015/0373683 A1* | 12/2015 | Schliwa-Bertling | H04W 4/70 370/329 |
| 2016/0295633 A1 | 10/2016 | Baligh et al. | |

FOREIGN PATENT DOCUMENTS

| | | |
|---|---|---|
| CN | 101674128 A | 3/2010 |
| CN | 102694618 A | 9/2012 |
| CN | 103826318 A | 5/2014 |
| EP | 2833669 A1 | 2/2015 |
| WO | 2009084998 A1 | 7/2009 |
| WO | 2014135126 A1 | 9/2014 |
| WO | 2015139850 A1 | 9/2015 |
| WO | 2016192597 A1 | 12/2016 |

OTHER PUBLICATIONS

Sony, "Scenarios and Operation of Mobility Using Uplink Measurements," 3GPP TSG RAN WG2 Meeting #96, R2-168558, Reno, USA, Nov. 14-18, 2016, 5 pages.

Huawei et al., "Benefit of UL beacon tracking for 'power saving state'," 3GPP TSG-RAN WG2 R2-165449, Meeting #95, Gothenburg, Sweden, Aug. 22-26, 2016, 6 pages.

Huawei, "UE centric design for NR," 3GPP TSG-RAN WG3 Meeting #93, R3-161839, Gothenburg, Sweden, Aug. 22-26, 2016, 2 pages.

Huawei et al., "Further discussion on RAN controlled state in NR," 3GPP TSG-RAN WG2 Meeting #95bis, R2-166995, Kaohsiung, Oct. 10-14, 2016, 4 pages.

* cited by examiner

US 10,674,386 B2

NETWORK OUT-OF-SYNCHRONIZATION STATE PROCESSING METHOD AND APPARATUS, AND NETWORK ACCESS METHOD AND APPARATUS

CROSS-REFERENCE TO RELATED APPLICATIONS

This application is a continuation of International Application PCT/CN2016/113949, filed on Dec. 30, 2016, which claims priority to Chinese Patent Application 201610158379.8, filed on Mar. 16, 2016. The disclosures of the aforementioned applications are hereby incorporated by reference in their entireties.

TECHNICAL FIELD

This application relates to the field of mobile communications technologies, and in particular, to a network out-of-synchronization state processing method and apparatus, and a network access method and apparatus.

BACKGROUND

With growth of mobile terminals and diversification of terminal service types, a user has an increasingly high requirement for a big-data throughput, and mobile communications networks certainly tend to have larger bandwidth and to be deployed in denser sites. Dense network deployment reduces a coverage area of each base station. However, because the coverage area is reduced, a terminal is handed over provided that the terminal moves for an extremely short distance.

To avoid overheads generated by a frequent terminal handover caused by the dense network deployment, a no-cell technology may be used. In the no-cell technology, a plurality of transmission points (TPs) form a logical cell (or referred to as a cell for short). Further, the plurality of TPs that form a cell may be divided into a plurality of groups, and each group of TPs are controlled by a logical entity (LE), and the terminal and one or more TPs in one logical entity perform uplink and downlink coordinated transmission. To reduce the overheads generated by the frequent handover, a terminal-centered network design method is used in the no-cell. To be specific, a network actively tracks the terminal. Specifically, in a no-cell system (NCS), when the terminal camps on an LE, a network side allocates a sequence number (Sequence Identification) and a tracking channel to the terminal. When the terminal is in an economic (ECO) state, the terminal may periodically send, on the tracking channel, an uplink tracking signal including the sequence number to a TP that covers the terminal, so that the LE can track the terminal based on the uplink tracking signal that is sent by the terminal and that is reported by the TP.

If the terminal is in the ECO state, when the terminal is disconnected from the network because of factors such as an obstacle or interference, the uplink tracking signal sent by the terminal cannot be received by the TP. In addition, because there is no downlink feedback for the uplink tracking signal, the terminal considers by default that the uplink tracking signal sent by the terminal has been received by the TP. If the LE does not receive, in a plurality of periods, the uplink tracking signal that is sent by the terminal and that is reported by the TP, the LE determines that the LE cannot track the terminal, thereby determining that the terminal is in a network out-of-synchronization state.

Currently, after the LE determines that the terminal is in the network out-of-synchronization state, there is no clear resolving method for processing the terminal by the network side.

SUMMARY

To resolve the foregoing problem, embodiments of this application provide a network out-of-synchronization state processing method and apparatus, and a network access method and apparatus.

An embodiment of this application provides a network out-of-synchronization state processing method. The method includes: instructing, by a first network device if the first network device does not receive, in a first time length after the first network device determines that a terminal is in a network out-of-synchronization state, a measurement message reported by a second network device in a signal coverage area of the first network device based on an uplink tracking signal of the terminal, at least one second network device in the signal coverage area of the first network device to send paging signaling to the terminal. The method also includes: setting, by the first network device, a network status of the terminal to a detached state if the first network device determines that in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

According to the method provided in this embodiment of this application, the first network device waits for the first time length after determining that the terminal is in the network out-of-synchronization state. If the first network device still does not receive, in the first time length, the measurement message reported by the second network device in the signal coverage area of the first network device based on the uplink tracking signal of the terminal, the first network device instructs the at least one second network device in the signal coverage area of the first network device to send the paging signaling to the terminal. In the method provided in this embodiment of this application, after determining that the terminal is in the network out-of-synchronization state, the first network device does not immediately instruct the second network device to send the paging signaling to the terminal, and instead, waits for the first time length, so as to avoid wrong determining of a status of the terminal, and avoid resource consumption caused by immediately instructing the second network device to send the paging signaling to the terminal, thereby improving resource utilization. After instructing the second network device to send the paging signaling to the terminal, the first network device sets the network status of the terminal to the detached state if the first network device determines that in the second time length, no second network device in the signal coverage area of the first network device receives the paging response sent by the terminal, and that the terminal is still in the network out-of-synchronization state. Using the method, resource consumption caused by continuously sending the paging signaling to the terminal when the terminal is in the network out-of-synchronization state is avoided.

Optionally, the method further includes: if the first network device receives, in the first time length after the first network device determines that the terminal is in the network out-of-synchronization state, the measurement message reported by the second network device in the signal coverage area of the first network device based on the uplink tracking signal of the terminal, determining, by the first network device, that the terminal restores a connection to a network.

According to the foregoing method, if the terminal restores the connection to the network in the first time length, resource consumption caused by immediately sending the paging signaling after the terminal is in the network out-of-synchronization state can be avoided.

Optionally, the method further includes: if the first network device determines that the at least one second network device in the signal coverage area of the first network device receives the paging response in the second time length, setting, by the first network device, the network status of the terminal to an attached state after the terminal accesses the network through a random access process.

According to the foregoing method, if the second network device receives the paging response in the second time length, resource consumption caused by immediately sending the paging signaling after the terminal is in the network out-of-synchronization state can be avoided.

Optionally, the instructing at least one second network device in the signal coverage area of the first network device to send paging signaling to the terminal includes: instructing, by the first network device, at least one second network device in a first area of the signal coverage area of the first network device to send the paging signaling to the terminal. The instructing further includes instructing, by the first network device if the first network device determines that no second network device in the first area receives the paging response in a third time length, and that the terminal is still in the network out-of-synchronization state, at least one second network device in a second area of the signal coverage area of the first network device to send the paging signaling to the terminal.

Optionally, that the first network device determines that in a second time length, no second network device in the signal coverage area of the first network device receives a paging response sent by the terminal, and that the terminal is still in the network out-of-synchronization state includes: if the first network device determines that no second network device in the second area receives the paging response in a fourth time length, and that the terminal is still in the network out-of-synchronization state, determining, by the first network device, that no second network device in the signal coverage area of the first network device receives, in the second time length, the paging response sent by the terminal, and that the terminal is still in the network out-of-synchronization state, where the second time length is equal to a sum of the third time length and the fourth time length.

Using the foregoing method, second network devices in different areas send the paging signaling to the terminal, to accelerate a speed at which the terminal accesses the network, and reduce an offline time length of the terminal.

Optionally, a size of the first area is less than or equal to a size of the second area.

Using the foregoing method, a quantity of second network devices that send the paging signaling to the terminal may be increased by gradually increasing a size of an area, to increase a probability that the terminal receives the paging signaling, and accelerate a speed at which the terminal accesses the network.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

Optionally, the at least one second network device in the signal coverage area of the first network device includes at least one target device; and the target device is a second network device that has received, before a moment at which the first network device determines that the terminal is in the network out-of-synchronization state, the uplink tracking signal sent by the terminal.

Using the foregoing method, the second network device that has previously received the uplink tracking signal sent by the terminal sends the paging signaling to the terminal, to increase a probability that the terminal receives the paging signaling, and accelerate a speed at which the terminal accesses the network.

Optionally, the instructing, by a first network device if the first network device does not receive, in a first time length after the first network device determines that a terminal is in a network out-of-synchronization state, a measurement message reported by a second network device in a signal coverage area of the first network device based on an uplink tracking signal of the terminal, at least one second network device in the signal coverage area of the first network device to send paging signaling to the terminal includes: starting, by the first network device, a first timer if the first network device determines that the terminal is in the network out-of-synchronization state, where a timing time length of the first timer is the first time length. The instructing further includes: if the first network device does not receive, before the first timer expires, the measurement message reported by the second network device in the signal coverage area of the first network device based on the uplink tracking signal of the terminal, instructing, by the first network device, the at least one second network device in the signal coverage area of the first network device to send the paging signaling to the terminal.

Optionally, the instructing, by the first network device if the first network device determines that no second network device in the first area receives the paging response in a third time length, and that the terminal is still in the network out-of-synchronization state, at least one second network device in a second area of the signal coverage area of the first network device to send the paging signaling to the terminal includes: starting, by the first network device, a second timer when instructing the at least one second network device in the first area of the signal coverage area of the first network device to send the paging signaling to the terminal, where a timing time length of the second timer is the third time length. The instructing further includes: if the first network device determines that no second network device in the first area receives the paging response before the second timer expires, and that the terminal is still in the network out-of-synchronization state, instructing, by the first network device, the at least one second network device in the second area of the signal coverage area of the first network device to send the paging signaling to the terminal.

Optionally, the setting, by the first network device, a network status of the terminal to a detached state if the first network device determines that in a second time length, no second network device in the signal coverage area of the first network device receives a paging response sent by the terminal, and that the terminal is still in the network out-of-synchronization state includes: starting, by the first network device, a third timer when the second timer expires, where a timing time length of the third timer is the fourth time length, The setting further includes: setting, by the first network device, the network status of the terminal to the detached state if the first network device determines that no second network device in the second area receives the paging response before the third timer expires, and that the terminal is still in the network out-of-synchronization state.

Optionally, that the first network device determines that a terminal is in a network out-of-synchronization state includes: if the first network device does not receive, in M consecutive periods, the measurement message reported by the second network device based on the uplink tracking signal of the terminal, or if the first network device does not receive, in a preset time length, the measurement message reported by the second network device based on the uplink tracking signal of the terminal, determining, by the first network device, that the terminal is in the network out-of-synchronization state.

An embodiment of this application provides a network access method, and the method includes: sending, by a terminal, an uplink message to a first transmission point N consecutive times, where N is a natural number. The method also includes: if the terminal determines that the first transmission point returns no feedback message for the uplink message sent N consecutive times, determining, by the terminal, that the terminal is in a network out-of-synchronization state. The method also includes: after determining that the terminal is in the network out-of-synchronization state, establishing, by the terminal, a connection to a second transmission point through a random access process.

Optionally, the uplink message is an uplink transmission request sent when the terminal is in an economic state and determines that data needs to be transmitted; or the uplink message is uplink data sent on a preset resource when the terminal is in an economic state; or the uplink message is uplink data sent when the terminal is in a connected state.

Optionally, the first transmission point and the second transmission point are a same transmission point; or the first transmission point and the second transmission point are different transmission points.

An embodiment of this application provides a network out-of-synchronization state processing apparatus. The apparatus includes a transceiver unit, configured to: if the transceiver unit does not receive, in a first time length after a terminal is in a network out-of-synchronization state, a measurement message reported by a second network device in a signal coverage area of a first network device based on an uplink tracking signal of the terminal, instruct at least one second network device in the signal coverage area of the first network device to send paging signaling to the terminal. The apparatus further includes a processing unit, configured to set a network status of the terminal to a detached state if in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

Optionally, the processing unit is further configured to: if the measurement message reported by the second network device in the signal coverage area of the first network device based on the uplink tracking signal of the terminal is received in the first time length after the terminal is in the network out-of-synchronization state, determine that the terminal restores a connection to a network.

Optionally, the processing unit is further configured to: if the at least one second network device in the signal coverage area of the first network device receives the paging response in the second time length, set the network status of the terminal to an attached state after the terminal accesses the network through a random access process.

Optionally, the transceiver unit is specifically configured to: instruct at least one second network device in a first area of the signal coverage area of the first network device to send the paging signaling to the terminal. The transceiver unit is further configured to: if no second network device in the first area receives the paging response in a third time length, and that the terminal is still in the network out-of-synchronization state, instruct at least one second network device in a second area of the signal coverage area of the first network device to send the paging signaling to the terminal.

Optionally, the transceiver unit is specifically configured to: if no second network device in the second area receives the paging response in a fourth time length, and that the terminal is still in the network out-of-synchronization state, determine that no second network device in the signal coverage area of the first network device receives, in the second time length, the paging response sent by the terminal, and that the terminal is still in the network out-of-synchronization state, where the second time length is equal to a sum of the third time length and the fourth time length.

Optionally, a size of the first area is less than or equal to a size of the second area.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

Optionally, the at least one second network device in the signal coverage area of the first network device includes at least one target device; and the target device is a second network device that has received, before a moment at which the first network device determines that the terminal is in the network out-of-synchronization state, the uplink tracking signal sent by the terminal.

Optionally, the transceiver unit is specifically configured to: start a first timer if the terminal is in the network out-of-synchronization state, where a timing time length of the first timer is the first time length. The transceiver unit is further configured to: if the measurement message reported by the second network device in the signal coverage area of the first network device based on the uplink tracking signal of the terminal is not received before the first timer expires, instruct the at least one second network device in the signal coverage area of the first network device to send the paging signaling to the terminal.

Optionally, the transceiver unit is specifically configured to: start a second timer when the at least one second network device in the first area of the signal coverage area of the first network device is instructed to send the paging signaling to the terminal, where a timing time length of the second timer is the third time length. The transceiver unit is further configured to: if no second network device in the first area receives the paging response before the second timer expires, and that the terminal is still in the network out-of-synchronization state, instruct the at least one second network device in the second area of the signal coverage area of the first network device to send the paging signaling to the terminal.

Optionally, the processing unit is specifically configured to: start a third timer when the second timer expires, where a timing time length of the third timer is the fourth time length; and set the network status of the terminal to the detached state if no second network device in the second area receives the paging response before the third timer expires, and that the terminal is still in the network out-of-synchronization state.

Optionally, the transceiver unit is specifically configured to: if the measurement message reported by the second network device based on the uplink tracking signal of the terminal is not received in M consecutive periods, or if the measurement message reported by the second network device based on the uplink tracking signal of the terminal is not received in a preset time length, determine that the terminal is in the network out-of-synchronization state.

An embodiment of this application provides a network access apparatus. The apparatus includes: a sending unit, configured to send an uplink message to a first transmission point N consecutive times, where N is a natural number. The apparatus further includes: a processing unit, configured to: if the first transmission point returns no feedback message for the uplink message sent N consecutive times, determine that a terminal is in a network out-of-synchronization state; and after the terminal is in the network out-of-synchronization state, establish a connection to a second transmission point through a random access process.

Optionally, the uplink message is an uplink transmission request sent when the terminal is in an economic state and determines that data needs to be transmitted; or the uplink message is uplink data sent on a preset resource when the terminal is in an economic state; or the uplink message is uplink data sent when the terminal is in a connected state.

Optionally, the first transmission point and the second transmission point are a same transmission point; or the first transmission point and the second transmission point are different transmission points.

An embodiment of this application provides a network out-of-synchronization state processing apparatus. The apparatus includes: a transceiver, configured to: if the transceiver unit does not receive, in a first time length after a terminal is in a network out-of-synchronization state, a measurement message reported by a second network device in a signal coverage area of a first network device based on an uplink tracking signal of the terminal, instruct at least one second network device in the signal coverage area of the first network device to send paging signaling to the terminal. The apparatus further includes: a processor, configured to set a network status of the terminal to a detached state if in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

Optionally, the processor is further configured to: if the measurement message reported by the second network device in the signal coverage area of the first network device based on the uplink tracking signal of the terminal is received in the first time length after the terminal is in the network out-of-synchronization state, determine that the terminal restores a connection to a network.

Optionally, the processor is further configured to: if the at least one second network device in the signal coverage area of the first network device receives the paging response in the second time length, set the network status of the terminal to an attached state after the terminal accesses the network through a random access process.

Optionally, the transceiver is specifically configured to: instruct at least one second network device in a first area of the signal coverage area of the first network device to send the paging signaling to the terminal. The transceiver is further configured to: if no second network device in the first area receives the paging response in a third time length, and that the terminal is still in the network out-of-synchronization state, instruct at least one second network device in a second area of the signal coverage area of the first network device to send the paging signaling to the terminal.

Optionally, the processor is specifically configured to: if no second network device in the second area receives the paging response in a fourth time length, and that the terminal is still in the network out-of-synchronization state, determine that no second network device in the signal coverage area of the first network device receives, in the second time length, the paging response sent by the terminal, and that the terminal is still in the network out-of-synchronization state, where the second time length is equal to a sum of the third time length and the fourth time length.

Optionally, a size of the first area is less than or equal to a size of the second area.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

Optionally, the at least one second network device in the signal coverage area of the first network device includes at least one target device; and the target device is a second network device that has received, before a moment at which the first network device determines that the terminal is in the network out-of-synchronization state, the uplink tracking signal sent by the terminal.

Optionally, the processor is specifically configured to: start a first timer if the terminal is in the network out-of-synchronization state, where a timing time length of the first timer is the first time length. The processor is further configured to: if the measurement message reported by the second network device in the signal coverage area of the first network device based on the uplink tracking signal of the terminal is not received before the first timer expires, instruct the at least one second network device in the signal coverage area of the first network device to send the paging signaling to the terminal.

Optionally, the processor is specifically configured to: start a second timer when the at least one second network device in the first area of the signal coverage area of the first network device is instructed to send the paging signaling to the terminal, where a timing time length of the second timer is the third time length. The processor is further configured to: if no second network device in the first area receives the paging response before the second timer expires, and that the terminal is still in the network out-of-synchronization state, instruct the at least one second network device in the second area of the signal coverage area of the first network device to send the paging signaling to the terminal.

Optionally, the processor is specifically configured to: start a third timer when the second timer expires, where a timing time length of the third timer is the fourth time length. The processor is further configured to: set the network status of the terminal to the detached state if no second network device in the second area receives the paging response before the third timer expires, and that the terminal is still in the network out-of-synchronization state.

Optionally, the processor is specifically configured to: if the measurement message reported by the second network device based on the uplink tracking signal of the terminal is not received in M consecutive periods, or if the measurement message reported by the second network device based on the uplink tracking signal of the terminal is not received in a preset time length, determine that the terminal is in the network out-of-synchronization state.

An embodiment of this application provides a network access apparatus. The apparatus includes: a transceiver, configured to send an uplink message to a first transmission point N consecutive times, where N is a natural number. The apparatus further includes: a processor, configured to: if the first transmission point returns no feedback message for the uplink message sent N consecutive times, determine that a terminal is in a network out-of-synchronization state, where the processor is configured to: after the terminal is in the network out-of-synchronization state, establish a connection to a second transmission point through a random access process.

Optionally, the uplink message is an uplink transmission request sent when the terminal is in an economic state and determines that data needs to be transmitted; or the uplink message is uplink data sent on a preset resource when the terminal is in an economic state; or the uplink message is uplink data sent when the terminal is in a connected state.

Optionally, the first transmission point and the second transmission point are a same transmission point; or the first transmission point and the second transmission point are different transmission points.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The embodiments of this application are applicable to a cellular network, for example, a 4th generation mobile communications (4G) evolution system such as Long Term Evolution (LTE), or a 5th generation mobile communications (5G) system.

In the embodiments of this application, the term "terminal" includes but is not limited to a mobile station, a fixed or mobile subscriber unit, a pager, a cellular phone, a personal digital assistant (PDA), a computer, or any other type of user equipment that can work in a wireless environment. The term "logical entity" includes but is not limited to a base station, a node, a base station controller, an access point (AP), a remote unit (RU), or any other type of interface device that can work in the wireless environment.

Figure 1:
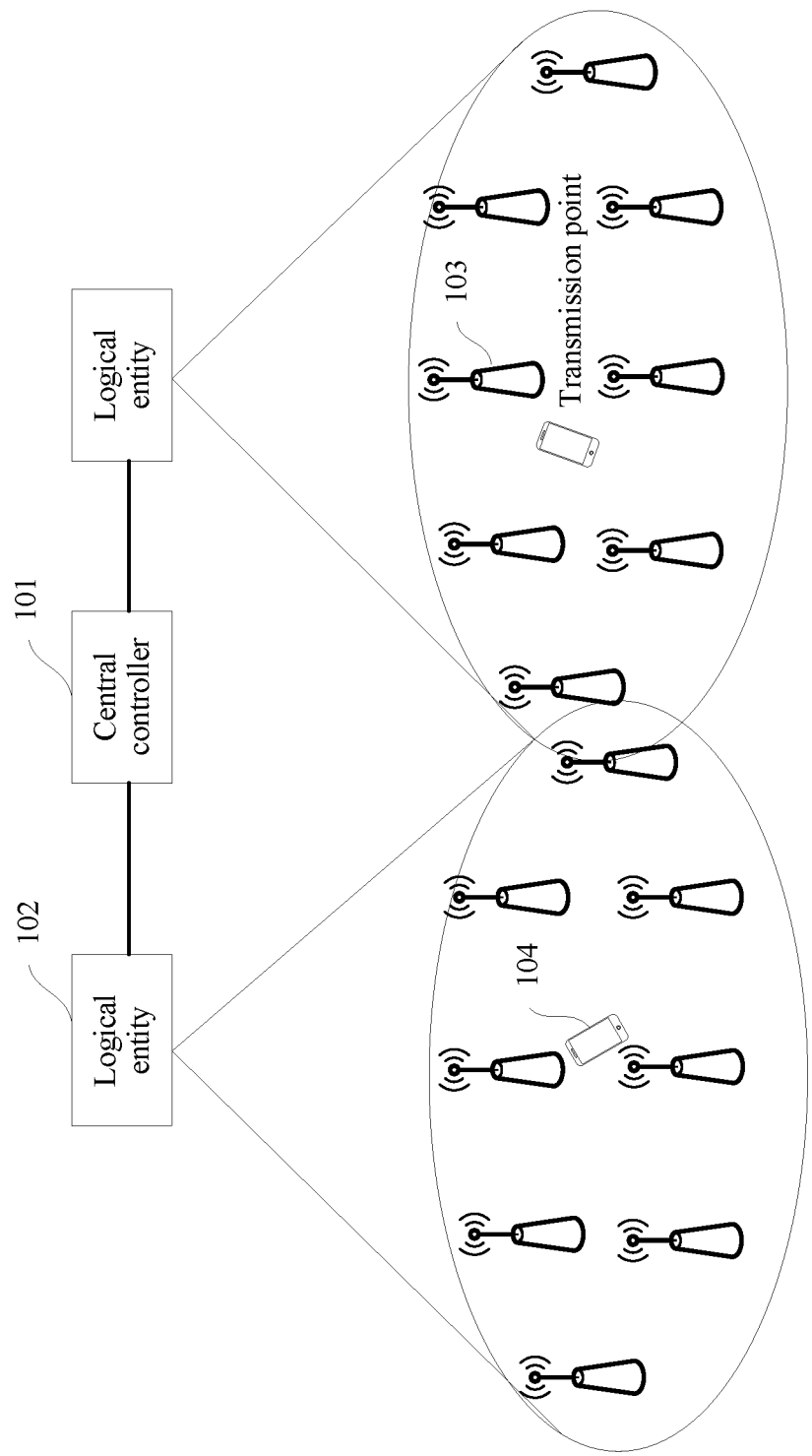
FIG. 1 is a schematic architectural diagram of a typical no-cell communications system.

As shown in FIG. 1, FIG. 1 is a schematic architectural diagram of a typical no-cell communications system.

In FIG. 1, a central controller 101 (CC) controls at least one logical entity 102 (LE), and the logical entity 102 controls at least one transmission point 103. A terminal 104 and one or more transmission points 103 in one logical entity 102 perform uplink and downlink coordinated transmission.

In the communications system architecture shown in FIG. 1, when the terminal 104 camps on a logical entity 102, a network side allocates a sequence number and a tracking channel to the terminal 104. The terminal 104 may periodically send, on the tracking channel, an uplink tracking signal including the sequence number to a transmission point 103 that covers the terminal 104, so that a network can track the terminal 104. The sequence number of the terminal 104 may remain unchanged in a logical entity 102. However, when the terminal 104 is handed over to another logical entity 102, the another logical entity 102 to which the terminal 104 is handed over needs to reallocate a sequence number and a tracking channel to the terminal 104.

It should be noted that the communications system architecture shown in FIG. 1 may be applied to a cellular network such as a 4G evolution system or a 5G system.

Currently, after determining that a terminal is in a network out-of-synchronization state, an LE may send a large amount of paging signaling to the terminal until the terminal sends a feedback message to a network based on the received paging signaling or restores a connection to a network based on the received paging signaling. However, if a network side sends a large amount of paging signaling to the terminal, excessive resource consumption is caused. Particularly, when a plurality of terminals is simultaneously in the network out-of-synchronization state, the entire network is flooded with a large amount of paging signaling, reducing a channel capacity.

Figure 2:
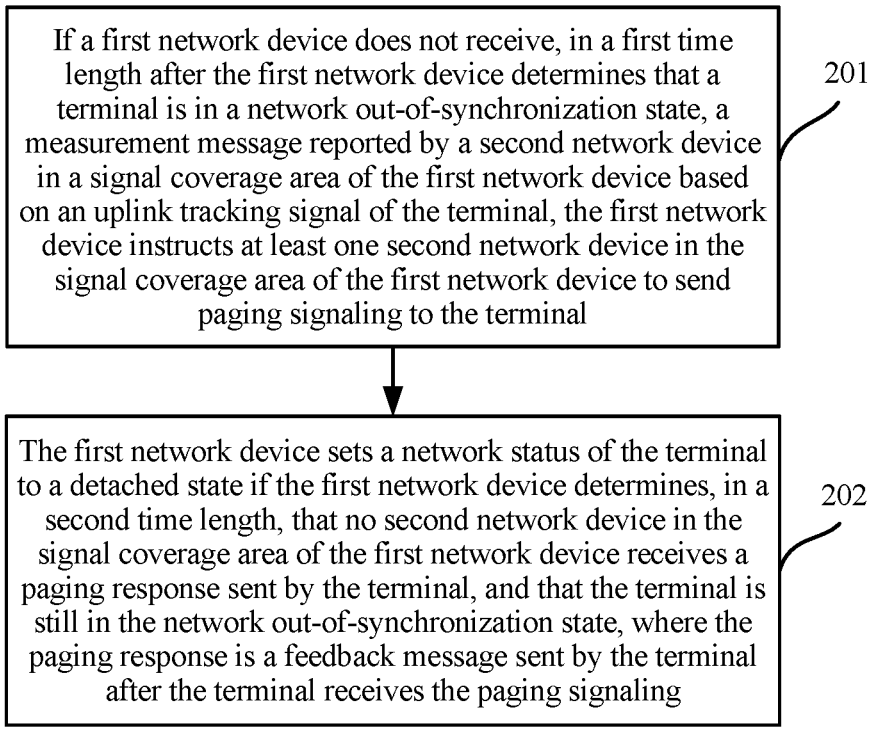
FIG. 2 is a schematic flowchart of a network out-of-synchronization state processing method according to an embodiment of this application.

Based on the foregoing description, to resolve the foregoing described problem, as shown in FIG. 2, an embodiment of this application provides a schematic flowchart of a network out-of-synchronization state processing method.

In a procedure shown in FIG. 2, a first network device may be a logical entity, and a second network device may be a transmission point.

Referring to FIG. 2, the method includes the following steps.

Step 201: If the first network device does not receive, in a first time length after the first network device determines that a terminal is in a network out-of-synchronization state, a measurement message reported by a second network device in a signal coverage area of the first network device based on an uplink tracking signal of the terminal, the first network device instructs at least one second network device in the signal coverage area of the first network device to send paging signaling to the terminal.

Step 202: The first network device sets a network status of the terminal to a detached state if the first network device determines that in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

In step 201, if a terminal camping on the signal coverage area of the first network device is in an ECO state, the terminal may send, on an uplink tracking channel allocated by the first network device to the terminal, the uplink tracking signal to the second network device in the signal coverage area of the first network device according to a preset rule. The preset rule may be periodically sending the uplink tracking signal, or may be another rule. Details are not described herein.

After receiving the uplink tracking signal sent by the terminal, the second network device may perform operations such as measurement and positioning on the terminal based on the received uplink tracking signal, to obtain a measurement result. The second network device may send the obtained measurement result to the first network device using the measurement message. The second network device may immediately send the measurement message to the first network device after determining the measurement result based on the uplink tracking signal of the terminal; or the second network device may send the measurement message to the first network device when determining that a location of the terminal changes; or the second network device may periodically send the measurement message to the first network device when determining that a location of the terminal does not change.

It should be noted that the measurement result may include information such as location information of the terminal. The content included in the measurement result may be the same as the content typically included in measurement results as understood by a person skilled in the art. Details of the content in the measurement result are not described herein. Correspondingly, a person skilled in the art may understand how the second network device specifically determines the measurement result based on the uplink tracking signal of the terminal. Details of how the measurement result is determined are not described herein.

In this embodiment of this application, the first network device may determine, in the following manner, whether the terminal is in the network out-of-synchronization state.

If the first network device does not receive, in M consecutive periods, the measurement message reported by the second network device based on the uplink tracking signal of the terminal, or if the first network device does not receive, in a preset time length, the measurement message reported by the second network device based on the uplink tracking signal of the terminal, the first network device determines that the first network device cannot track the terminal, thereby determining that the terminal is in the network out-of-synchronization state. M may be determined based on an actual situation, and the preset time length may also be determined based on an actual situation. Details are not described herein.

In this embodiment of this application, after the first network device determines that the terminal is in the network out-of-synchronization state, the terminal may restore a connection to a network. To avoid resource consumption caused by immediately sending the paging signaling after the terminal is in the network out-of-synchronization state, the first network device may wait for the first time length, and after determining that the first network device still does not receive, in the first time length, the measurement message reported by the second network device based on the uplink tracking signal of the terminal, the first network device instructs the at least one second network device to send the paging signaling. The first time length may be determined based on an actual situation. Details are not described herein.

Specifically, the first network device may start a first timer after determining that the terminal is in the network out-of-synchronization state. A timing time length of the first timer is the first time length. If the first network device does not receive, before the first timer expires, the measurement message reported by the second network device in the signal coverage area of the first network device based on the uplink tracking signal of the terminal, the first network device instructs the at least one second network device in the signal coverage area of the first network device to send the paging signaling to the terminal. If the first network device receives, before the first timer expires, the measurement message reported by the second network device in the signal coverage area of the first network device based on the uplink tracking signal of the terminal, the first network device determines that the terminal restores the connection to the network.

It should be noted that the paging signaling may be used to instruct the terminal to re-access any second network device through a random access process.

When determining that the terminal restores the connection to the network, the first network device may further disable the first timer, and instruct the at least one second network device in the signal coverage area of the first network device to stop sending the paging signaling to the terminal.

It should be noted that, that the terminal restores the connection to the network may be that the terminal re-accesses any second network device in the signal coverage area of the first network device; or that the terminal restores the connection to the network may be that the terminal re-accesses any second network device in a signal coverage area of another first network device. For example, if the first network device receives the measurement message reported by the second network device in the signal coverage area of the first network device based on the uplink tracking signal of the terminal, or if the first network device determines that the second network device in the signal coverage area of the first network device receives an uplink message sent by the terminal, the first network device determines that the terminal restores the connection to the network. The uplink message may be an uplink transmission request sent when the terminal is in an economic state and determines that data needs to be transmitted; or the uplink message is uplink data sent on a preset resource when the terminal is in an economic state; or the uplink message is uplink data sent when the terminal in a connected state.

Optionally, in this embodiment of this application, the at least one second network device in the signal coverage area of the first network device includes at least one target device. The target device may be a second network device that has received, before a moment at which the first network device determines that the terminal is in the network out-of-synchronization state, the uplink tracking signal sent by the terminal; or the target device may be a second network device that covers a current location of the terminal. Because the target device is the second network device that has received, before the moment at which the terminal is in the network out-of-synchronization state, the uplink tracking signal sent by the terminal, a probability that the terminal receives the paging signaling sent by the target device is higher. Therefore, the terminal may quickly access the network.

In step 202, a start moment of the second time length may be a moment at which the first network device instructs the at least one second network device in the signal coverage area of the first network device to send the paging signaling to the terminal. A specific length of the second time length may be determined based on an actual situation. Details are not described herein.

If the second network device receives the paging response sent by the terminal, the second network device may send a notification message to the first network device, so that the first network device determines, based on the notification message, that the second network device receives the paging response. Certainly, the second network device may not need to send the notification message. Instead, after the terminal accesses the second network device based on the paging signaling, when the first network device receives the uplink message that is of the terminal and that is forwarded by the second network device, the first network device may determine that the at least one second network device in the signal coverage area of the first network device receives the paging response.

If the first network device determines that the at least one second network device in the signal coverage area of the first network device receives the paging response in the second time length, the first network device sets the network status of the terminal to an attached state after the terminal accesses the network through the random access process. Alternatively, if the first network device determines that the terminal restores the connection to the network in the second time length, the first network device sets the network status of the terminal to an attached state.

When determining to set the network status of the terminal to the attached state, the first network device may further instruct the second network device to set the network status of the terminal to the attached state.

Optionally, the first network device may further divide the second time length into a plurality of time lengths, and instruct, in each time length, second network devices in different coverage areas to send the paging signaling to the terminal. A quantity of time lengths into which the second time length is specifically divided is not limited in this embodiment of this application. That the first network device divides the second time length into two time lengths is used as an example for description below. For a case in which the second time length is divided into more than two time lengths, refer to the following description. Details are not described again in this embodiment of this application.

The first network device divides the second time length into a third time length and a fourth time length. The second time length is equal to a sum of the third time length and the fourth time length, and the third time length is before the fourth time length. Certainly, the foregoing description is merely an example, and a sequence of the third time length and the fourth time length may also be opposite to that described above. Details are not described herein.

After determining that the terminal is in the network out-of-synchronization state, the first network device instructs at least one second network device in a first area of the signal coverage area of the first network device to send the paging signaling to the terminal. If the first network device determines that no second network device in the first area receives the paging response in the third time length, and that the terminal is still in the network out-of-synchronization state, the first network device instructs at least one second network device in a second area of the signal coverage area of the first network device to send the paging signaling to the terminal. The first network device sets the network status of the terminal to the detached state if the first network device determines that no second network device in the second area receives the paging response in the fourth time length, and that the terminal is still in the network out-of-synchronization state.

If the first network device determines that the at least one second network device in the first area receives the paging response in the third time length, or if the first network device determines that the terminal restores the connection to the network in the third time length, the paging signaling is no longer sent to the terminal using the at least one second network device in the first area. Correspondingly, if the first network device determines that the at least one second network device in the second area receives the paging response in the fourth time length, or if the first network device determines that the terminal restores the connection to the network in the fourth time length, the paging signaling is no longer sent to the terminal using the at least one second network device in the second area.

A size of the first area may be less than or equal to a size of the second area. The at least one second network device in the first area includes at least one target device, and the at least one second network device in the second area includes at least one target device.

In this embodiment of this application, a specific length of the third time length and a specific length of the fourth time length may be determined based on an actual situation. Details are not described herein.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

In this embodiment of this application, timing may be implemented by setting a timer. Specifically, with reference to the foregoing description, the first network device starts a second timer when instructing the at least one second network device in the first area of the signal coverage area of the first network device to send the paging signaling to the terminal. A timing time length of the second timer is the third time length. If the first network device determines that no second network device in the first area receives the paging response before the second timer expires, and that the terminal is still in the network out-of-synchronization state, the first network device instructs the at least one second network device in the second area of the signal coverage area of the first network device to send the paging signaling to the terminal.

The first network device starts a third timer when the second timer expires. A timing time length of the third timer is the fourth time length. If the first network device determines that no second network device in the second area receives the paging response before the third timer expires, and that the terminal is still in the network out-of-synchronization state, the first network device sets the network status of the terminal to the detached state.

Figure 3:
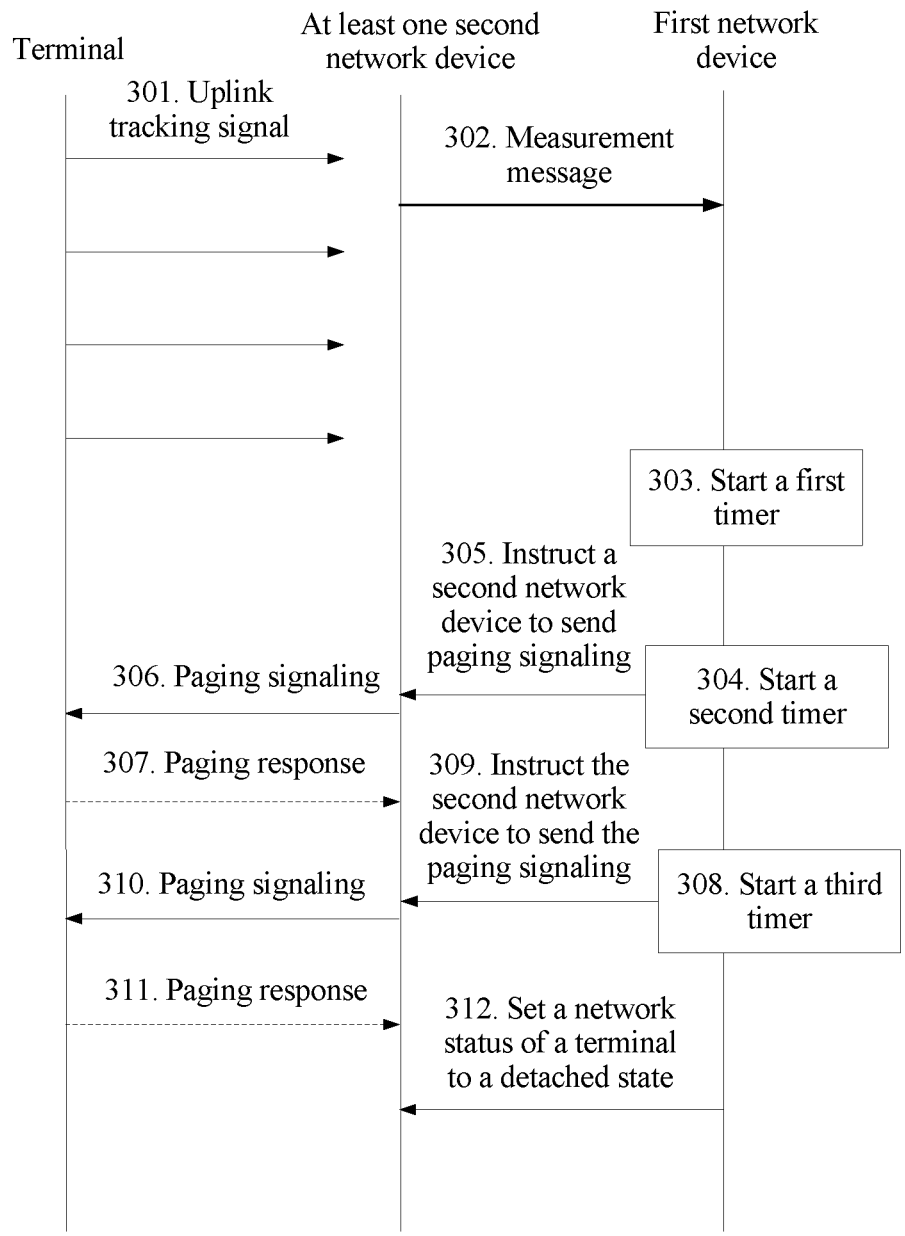
FIG. 3 is a schematic diagram of a network out-of-synchronization state processing procedure according to an embodiment of this application.

With reference to the foregoing description, as shown in FIG. 3, FIG. 3 is a schematic diagram of a network out-of-synchronization state processing procedure according to an embodiment of this application.

As shown in FIG. 3, in step 301, a terminal sends an uplink tracking signal to at least one second network device.

Step 302: The second network device sends a measurement message to a first network device after receiving the uplink tracking signal.

Step 303: The first network device starts a first timer after determining that the terminal is in a network out-of-synchronization state.

If the first network device does not receive, in M consecutive periods, the measurement message reported by the second network device, or if the first network device does not receive, in a preset time length, the measurement message reported by the second network device, the first network device determines that the terminal is in the network out-of-synchronization state.

Step 304: The first network device starts a second timer if the first network device determines that the first network device still does not receive the measurement message before the first timer expires.

Step 305: When starting the second timer, the first network device instructs the at least one second network device to send paging signaling to the terminal.

Step 306: The at least one second network device sends the paging signaling to the terminal.

Optionally, in step 307, the terminal sends a paging response to the second network device after receiving the paging signaling.

In this case, after determining that the second network device receives the paging response, the first network device stops timing of the second timer, and instructs the at least one second network device to stop sending the paging signaling.

Step 308: The first network device starts a third timer if the first network device determines that no second network device receives the paging response before the second timer expires.

Step 309: When starting the third timer, the first network device instructs the at least one second network device to send the paging signaling to the terminal.

Step 310: The at least one second network device sends the paging signaling to the terminal.

Optionally, in step 311, the terminal sends the paging response to the second network device after receiving the paging signaling.

In this case, after determining that the second network device receives the paging response, the first network device stops timing of the third timer, and instructs the at least one second network device to stop sending the paging signaling.

Step 312: The first network device sets a network status of the terminal to a detached state.

Certainly, the foregoing description is merely an example, and timing may also be implemented in another manner. Details are not described herein.

The foregoing describes operations performed by the first network device when the first network device determines that the terminal is in the network out-of-synchronization state. The terminal can also determine whether the terminal is in the network out-of-synchronization state. Therefore, an embodiment of this application further provides a network access method, to provide a solution performed after the terminal determines that the terminal is in the network out-of-synchronization state.

Figure 4:
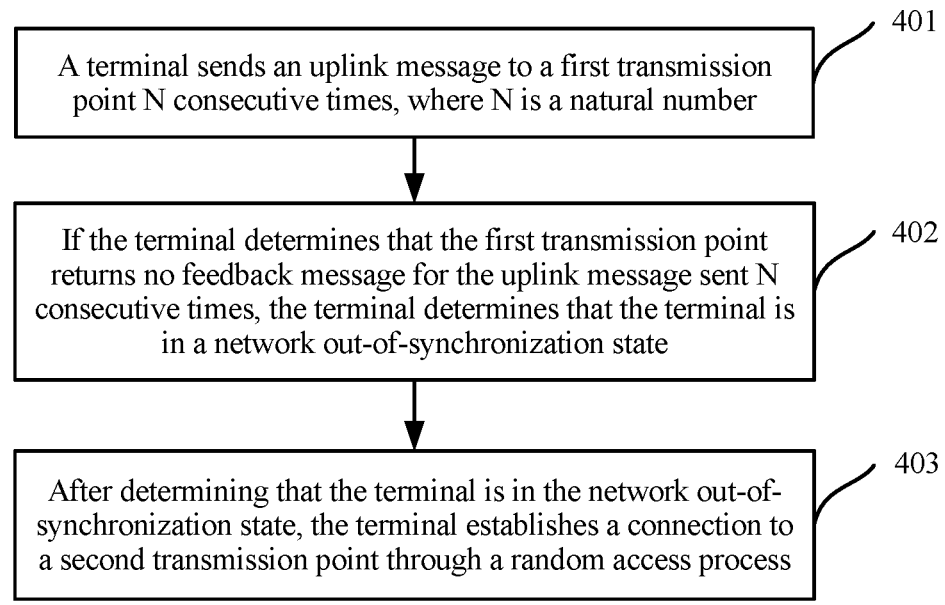
FIG. 4 is a schematic flowchart of a network access method according to an embodiment of this application.

Specifically, as shown in FIG. 4, an embodiment of this application provides a schematic flowchart of a network access method.

Referring to FIG. 4, the method includes the following steps.

Step 401: a terminal sends an uplink message to a first transmission point N consecutive times, where N is a natural number.

Step 402: If the terminal determines that the first transmission point returns no feedback message for the uplink message sent N consecutive times, the terminal determines that the terminal is in a network out-of-synchronization state.

Step 403: After determining that the terminal is in the network out-of-synchronization state, the terminal establishes a connection to a second transmission point through a random access process.

In step 401, the uplink message sent by the terminal may be an uplink transmission request, or may be uplink data.

For example, the uplink message may be an uplink transmission request sent when the terminal is in an economic state and determines that data needs to be transmitted. The uplink transmission request may be sent on a tracking channel allocated by a network side to the terminal, and a time-frequency resource used to send the uplink transmission request and a time-frequency resource used to receive a feedback message, of the first transmission point, for the uplink transmission request may be different or may be the same.

For another example, the uplink message may be uplink data sent on a preset resource when the terminal is in an economic state.

For another example, the uplink message may be uplink data sent when the terminal is in a connected state.

In this embodiment of this application, a value of N may be determined based on an actual situation. Details are not described herein. For example, N may be 4.

In step 402, a feedback message returned by the first transmission point to the terminal may be an acknowledgement message, or may be a negative acknowledgement message. Certainly, the feedback message may be another message. Details are not described herein.

In step 403, the second transmission point to which the terminal establishes the connection through the random access process may be the first transmission point, or may not be the first transmission point. In other words, the first transmission point and the second transmission point may be a same transmission point, or the first transmission point and the second transmission point may be different transmission points. This is not limited in this embodiment of this application.

It should be noted that in this embodiment of this application, when establishing the connection to the second transmission point through the random access process, the terminal may carry a sequence number previously allocated by the network side to the terminal, to quickly access a network.

Figure 5:
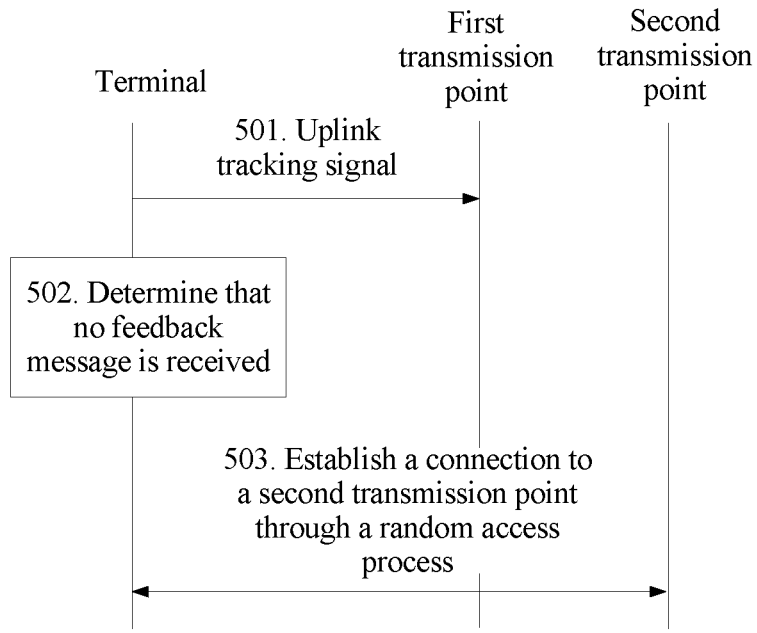
FIG. 5 is a schematic diagram of a network access procedure according to an embodiment of this application.

With reference to the foregoing description, as shown in FIG. 5, FIG. 5 is a schematic diagram of a network access procedure according to an embodiment of this application.

As shown in FIG. 5, in step 501, a terminal sends an uplink message to a first transmission point N consecutive times.

Step 502: If the terminal determines that the terminal does not receive a feedback message for the uplink message sent N consecutive times, the terminal determines that the terminal is in a network out-of-synchronization state.

Step 503: The terminal establishes a connection to a second transmission point through a random access process.

Based on a same technical concept, an embodiment of this application further provides a network out-of-synchronization state processing apparatus, and the apparatus may execute the foregoing method embodiment.

Figure 6:
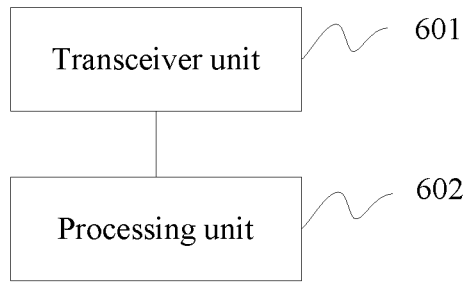
FIG. 6 is a schematic structural diagram of a network out-of-synchronization state processing apparatus according to an embodiment of this application.

As shown in FIG. 6, FIG. 6 is a schematic structural diagram of a network out-of-synchronization state processing apparatus according to an embodiment of this application.

The apparatus includes a transceiver unit 601, configured to: if the transceiver unit 601 does not receive, in a first time length after a terminal is in a network out-of-synchronization state, a measurement message reported by a second network device in a signal coverage area of a first network device based on an uplink tracking signal of the terminal, instruct at least one second network device in the signal coverage area of the first network device to send paging signaling to the terminal. The apparatus further includes a processing unit 602, configured to set a network status of the terminal to a detached state if in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

Optionally, the processing unit 602 is further configured to: if the measurement message reported by the second network device in the signal coverage area of the first network device based on the uplink tracking signal of the terminal is received in the first time length after the terminal is in the network out-of-synchronization state, determine that the terminal restores a connection to a network.

Optionally, the processing unit 602 is further configured to: if the at least one second network device in the signal coverage area of the first network device receives the paging response in the second time length, set the network status of the terminal to an attached state after the terminal accesses the network through a random access process.

Optionally, the transceiver unit 601 is specifically configured to: instruct at least one second network device in a first area of the signal coverage area of the first network device to send the paging signaling to the terminal. The transceiver unit 601 is further configured to: if no second network device in the first area receives the paging response in a third time length, and that the terminal is still in the network out-of-synchronization state, instruct at least one second network device in a second area of the signal coverage area of the first network device to send the paging signaling to the terminal.

Optionally, the processing unit 602 is specifically configured to: if no second network device in the second area receives the paging response in a fourth time length, and that the terminal is still in the network out-of-synchronization state, determine that no second network device in the signal coverage area of the first network device receives, in the second time length, the paging response sent by the terminal, and that the terminal is still in the network out-of-synchronization state.

The second time length is equal to a sum of the third time length and the fourth time length.

Optionally, a size of the first area is less than or equal to a size of the second area.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

Optionally, the at least one second network device in the signal coverage area of the first network device includes at least one target device.

The target device is a second network device that has received, before a moment at which the first network device determines that the terminal is in the network out-of-synchronization state, the uplink tracking signal sent by the terminal.

Optionally, the transceiver unit 601 is specifically configured to: start a first timer if the terminal is in the network out-of-synchronization state, where a timing time length of the first timer is the first time length. The transceiver unit 601 is further configured to: if the measurement message reported by the second network device in the signal coverage area of the first network device based on the uplink tracking signal of the terminal is not received before the first timer expires, instruct the at least one second network device in the signal coverage area of the first network device to send the paging signaling to the terminal.

Optionally, the transceiver unit 601 is specifically configured to: start a second timer when the at least one second network device in the first area of the signal coverage area of the first network device is instructed to send the paging signaling to the terminal, where a timing time length of the second timer is the third time length. The transceiver unit 601 is further configured to: if no second network device in the first area receives the paging response before the second timer expires, and that the terminal is still in the network out-of-synchronization state, instruct the at least one second network device in the second area of the signal coverage area of the first network device to send the paging signaling to the terminal.

Optionally, the processing unit 602 is specifically configured to: start a third timer when the second timer expires, where a timing time length of the third timer is the fourth time length; and set the network status of the terminal to the detached state if no second network device in the second area receives the paging response before the third timer expires, and that the terminal is still in the network out-of-synchronization state.

Optionally, the transceiver unit 601 is specifically configured to: if the measurement message reported by the second network device based on the uplink tracking signal of the terminal is not received in M consecutive periods, or if the measurement message reported by the second network device based on the uplink tracking signal of the terminal is not received in a preset time length, determine that the terminal is in the network out-of-synchronization state.

Based on a same technical concept, an embodiment of this application further provides a network access apparatus, and the apparatus may execute the foregoing method embodiment.

Figure 7:
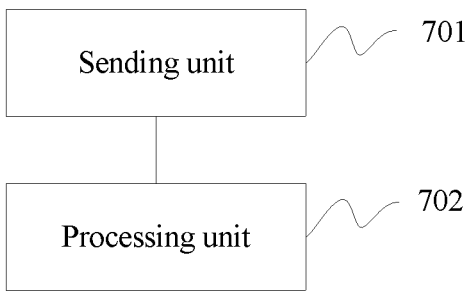
FIG. 7 is a schematic structural diagram of a network access apparatus according to an embodiment of this application.

As shown in FIG. 7, FIG. 7 is a schematic structural diagram of a network access apparatus according to an embodiment of this application.

The apparatus includes a sending unit 701, configured to send an uplink message to a first transmission point N consecutive times, where N is a natural number. The apparatus further includes a processing unit 702, configured to: if the first transmission point returns no feedback message for the uplink message sent N consecutive times, determine a the terminal is in a network out-of-synchronization state; and after the terminal is in the network out-of-synchronization state, establish a connection to a second transmission point through a random access process.

Optionally, the uplink message is an uplink transmission request sent when the terminal is in an economic state and determines that data needs to be transmitted; or the uplink message is uplink data sent on a preset resource when the terminal is in an economic state; or the uplink message is uplink data sent when the terminal is in a connected state.

Optionally, the first transmission point and the second transmission point are a same transmission point; or the first transmission point and the second transmission point are different transmission points.

Based on a same technical concept, an embodiment of this application further provides a network out-of-synchronization state processing apparatus, and the apparatus may execute the foregoing method embodiment.

Figure 8:
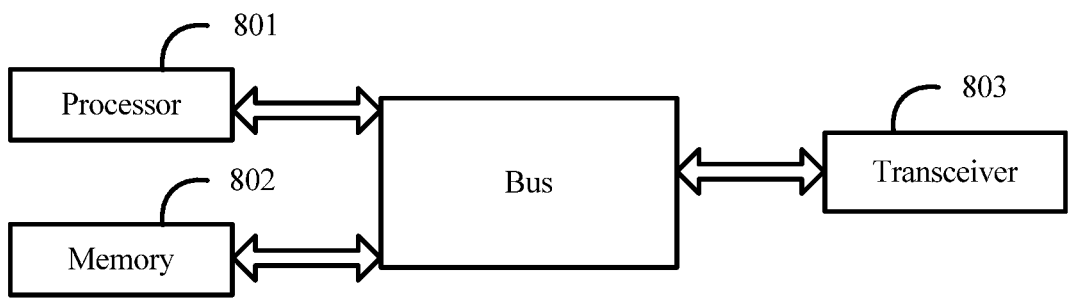
FIG. 8 is a schematic structural diagram of a network out-of-synchronization state processing apparatus according to an embodiment of this application.

As shown in FIG. 8, FIG. 8 is a schematic structural diagram of a network out-of-synchronization state processing apparatus according to an embodiment of this application.

The apparatus includes a processor 801, a memory 802, and a transceiver 803.

The transceiver 803 may be a wired transceiver, a wireless transceiver, or a combination thereof. For example, the wired transceiver may be an Ethernet interface. The Ethernet interface may be an optical interface, an electrical interface, or a combination thereof. For example, the wireless transceiver may be a wireless local area network transceiver, a cellular network transceiver, or a combination thereof. The processor 801 may be a central processing unit (CPU), a network processor (NP), or a combination of a CPU and an NP. The processor 801 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof. The memory 802 may include a volatile memory such as a random access memory (RAM). Alternatively, the memory 802 may include a nonvolatile memory such as a read-only memory (ROM), a flash memory, a hard disk drive (HDD), or a solid state drive (SSD). Alternatively, the memory 802 may include a combination of the foregoing types of memories.

The memory 802 may be configured to store a program.

The transceiver 803 is configured to: if the transceiver 803 does not receive, in a first time length after a terminal is in a network out-of-synchronization state, a measurement message reported by a second network device in a signal coverage area of a first network device based on an uplink tracking signal of the terminal, instruct at least one second network device in the signal coverage area of the first network device to send paging signaling to the terminal.

The processor 801 reads, from the memory 802, an instruction corresponding to the program, to perform the following operation: setting a network status of the terminal to a detached state if in a second time length, no second network device in the signal coverage area of the first network device receives a paging response sent by the terminal, and that the terminal is still in the network out-of-synchronization state, where the paging response is a feedback message sent by the terminal after the terminal receives the paging signaling.

Optionally, the processor 801 is further configured to: if the measurement message reported by the second network device in the signal coverage area of the first network device based on the uplink tracking signal of the terminal is received in the first time length after the terminal is in the network out-of-synchronization state, determine that the terminal restores a connection to a network.

Optionally, the processor 801 is further configured to: if the at least one second network device in the signal coverage area of the first network device receives the paging response in the second time length, set the network status of the terminal to an attached state after the terminal accesses the network through a random access process.

Optionally, the transceiver 803 is specifically configured to: instruct at least one second network device in a first area of the signal coverage area of the first network device to send the paging signaling to the terminal; and if no second network device in the first area receives the paging response in a third time length, and that the terminal is still in the network out-of-synchronization state, instruct at least one second network device in a second area of the signal coverage area of the first network device to send the paging signaling to the terminal.

Optionally, the processor 801 is specifically configured to: if no second network device in the second area receives the paging response in a fourth time length, and that the terminal is still in the network out-of-synchronization state, determine that no second network device in the signal coverage area of the first network device receives, in the second time length, the paging response sent by the terminal, and that the terminal is still in the network out-of-synchronization state.

The second time length is equal to a sum of the third time length and the fourth time length.

Optionally, a size of the first area is less than or equal to a size of the second area.

Optionally, the third time length is a required maximum time length between a moment at which the first network device instructs the at least one second network device in the first area to send the paging signaling to the terminal and a moment at which the at least one second network device in the first area receives the paging response.

Optionally, the fourth time length is a required maximum time length between a moment at which the first network device instructs the at least one second network device in the second area to send the paging signaling to the terminal and a moment at which the at least one second network device in the second area receives the paging response.

Optionally, the at least one second network device in the signal coverage area of the first network device includes at least one target device.

The target device is a second network device that has received, before a moment at which the first network device determines that the terminal is in the network out-of-synchronization state, the uplink tracking signal sent by the terminal.

Optionally, the processor 801 is specifically configured to: start a first timer if the terminal is in the network out-of-synchronization state, where a timing time length of the first timer is the first time length. The processor 801 is further configured to: if the measurement message reported by the second network device in the signal coverage area of the first network device based on the uplink tracking signal of the terminal is not received before the first timer expires, instruct the at least one second network device in the signal coverage area of the first network device to send the paging signaling to the terminal.

Optionally, the processor 801 is specifically configured to: start a second timer when the at least one second network device in the first area of the signal coverage area of the first network device is instructed to send the paging signaling to the terminal, where a timing time length of the second timer is the third time length. The processor 801 is further configured to: if no second network device in the first area receives the paging response before the second timer expires, and that the terminal is still in the network out-of-synchronization state, instruct the at least one second network device in the second area of the signal coverage area of the first network device to send the paging signaling to the terminal.

Optionally, the processor 801 is specifically configured to: start a third timer when the second timer expires, where a timing time length of the third timer is the fourth time length; and set the network status of the terminal to the detached state if no second network device in the second area receives the paging response before the third timer expires, and that the terminal is still in the network out-of-synchronization state.

Optionally, the processor 801 is specifically configured to: if the measurement message reported by the second network device based on the uplink tracking signal of the terminal is not received in M consecutive periods, or if the measurement message reported by the second network device based on the uplink tracking signal of the terminal is not received in a preset time length, determine that the terminal is in the network out-of-synchronization state.

A bus may further be included in FIG. 8. The bus may include any quantity of interconnected buses and bridges, and specifically links various circuits of one or more processors represented by the processor and a memory represented by the memory. The bus may further link various other circuits such as a peripheral device, a voltage stabilizer, and a power management circuit. This is not further described in this application. The transceiver provides a unit for communicating with various other devices on a transmission medium. The processor is responsible for bus architecture management and general processing. The memory may store data used when the processor performs an operation.

An embodiment of this application provides a network access apparatus, and the apparatus includes.

Based on a same technical concept, an embodiment of this application further provides a network access apparatus, and the apparatus may execute the foregoing method embodiment.

Figure 9:
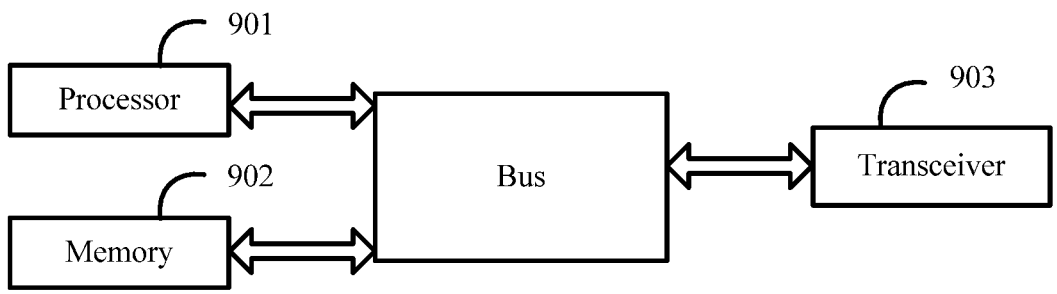
FIG. 9 is a schematic structural diagram of a network access apparatus according to an embodiment of this application.

As shown in FIG. 9, FIG. 9 is a schematic structural diagram of a network access apparatus according to an embodiment of this application.

The apparatus includes a processor 901, a memory 902, and a transceiver 903.

The transceiver 903 may be a wired transceiver, a wireless transceiver, or a combination thereof. For example, the wired transceiver may be an Ethernet interface. The Ethernet interface may be an optical interface, an electrical interface, or a combination thereof. For example, the wireless transceiver may be a wireless local area network transceiver, a cellular network transceiver, or a combination thereof. The processor 901 may be a CPU, an NP, or a combination of a CPU and an NP. The processor 901 may further include a hardware chip. The hardware chip may be an application-specific integrated circuit ASIC, a PLD, or a combination thereof. The PLD may be a CPLD, an FPGA, a GAL, or any combination thereof. The memory 902 may include a volatile memory such as a RAM. Alternatively, the memory 902 may include a nonvolatile memory such as a ROM, a flash memory, an HDD, or an SSD. Alternatively, the memory 902 may include a combination of the foregoing types of memories.

The memory 902 may be configured to store a program.

The transceiver 903 is configured to send an uplink message to a first transmission point N consecutive times, where N is a natural number.

The processor 901 reads, from the memory 902, an instruction corresponding to the program, to perform the following operations: if the first transmission point returns no feedback message for the uplink message sent N consecutive times, determining that the terminal is in a network out-of-synchronization state, where N is a natural number. The processor 901 is further configured to: after determining that the terminal is in the network out-of-synchronization state, establishing a connection to a second transmission point through a random access process.

Optionally, the uplink message is an uplink transmission request sent when the terminal is in an economic state and determines that data needs to be transmitted; or the uplink message is uplink data sent on a preset resource when the terminal is in an economic state; or the uplink message is uplink data sent when the terminal is in a connected state.

Optionally, the first transmission point and the second transmission point are a same transmission point; or the first transmission point and the second transmission point are different transmission points.

A bus may further be included in FIG. 9. The bus may include any quantity of interconnected buses and bridges, and specifically links various circuits of one or more processors represented by the processor and a memory represented by the memory. The bus may further link various other circuits such as a peripheral device, a voltage stabilizer, and a power management circuit. This is not further described in this application. The transceiver provides a unit for communicating with various other devices on a transmission medium. The processor is responsible for bus architecture management and general processing. The memory may store data used when the processor performs an operation.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to this application without departing from the scope of this application. This application is intended to cover these modifications and variations of this application provided that they fall within the scope defined by the following claims in this application.

What is claimed is:

1. A method, comprising:
   when a first network device does not receive, in a first time length after the first network device determines that a terminal is in a network out-of-synchronization state, a measurement message reported by a second network device of a plurality of second network devices, instructing, by the first network device, at least one third network device of the plurality of second network devices to send paging signaling to the terminal, wherein the measurement message is based on an uplink tracking signal of the terminal, and wherein the plurality of second network devices is in a signal coverage area of the first network device; and
   when the first network device determines that, in a second time length, the plurality of second network devices has not received a paging response from the terminal, and that the terminal is still in the network out-of-synchronization state, setting, by the first network device, a network status of the terminal to a detached state, wherein the paging response is a feedback message sent by the terminal in response to the terminal receiving the paging signaling.

2. The method according to claim 1, further comprising:
   when the first network device receives, in the first time length after the first network device determines that the terminal is in the network out-of-synchronization state, the measurement message reported by the second network device, determining, by the first network device, that the terminal has restored a connection to a network.

3. The method according to claim 1, further comprising:
   when the first network device determines that the at least one third network device of the plurality of second network devices has received the paging response in the second time length, setting, by the first network device, the network status of the terminal to an attached state after the terminal accesses a network through a random access process.

4. The method according to claim 1, wherein instructing the at least one third network device of the plurality of second network devices to send the paging signaling to the terminal comprises:
   instructing, by the first network device, at least one fourth network device of the plurality of second network devices to send the paging signaling to the terminal, wherein the at least one fourth network device is in a first area of the signal coverage area of the first network device; and
   when the first network device determines that the at least one fourth network device has not received the paging response in a third time length, and that the terminal is still in the network out-of-synchronization state, instructing, by the first network device, at least one fifth network device of the plurality of second network devices to send the paging signaling to the terminal, wherein the at least one fifth network device is in a second area of the signal coverage area of the first network device.

5. The method according to claim 4, wherein determining that, in the second time length, the plurality of second network devices has not received the paging response from the terminal, and that the terminal is still in the network out-of-synchronization state comprises:
   when the first network device determines that the at least one fifth network device has not received the paging response in a fourth time length, and that the terminal is still in the network out-of-synchronization state, determining, by the first network device, that the plurality of second network devices has not received, in the second time length, the paging response sent by the terminal, and that the terminal is still in the network out-of-synchronization state, wherein the second time length is equal to a sum of the third time length and the fourth time length.

6. The method according to claim 5, wherein instructing, by the first network device, the at least one fifth network device to send the paging signaling to the terminal comprises:
   when instructing the at least one fourth network device to send the paging signaling to the terminal, starting, by the first network device, a second timer, wherein a second timing time length of the second timer is the third time length; and
   when the first network device determines that the at least one fourth network device has not received the paging response before the second timer expires, and that the terminal is still in the network out-of-synchronization state, instructing, by the first network device, the at least one fifth network device to send the paging signaling to the terminal.

7. The method according to claim 6, wherein setting, by the first network device, the network status of the terminal to the detached state comprises:
   when the second timer expires, starting, by the first network device, a third timer, wherein a third timing time length of the third timer is the fourth time length; and when the first network device determines that the at least one fifth network device has not received the paging response before the third timer expires, and that the terminal is still in the network out-of-synchronization state, setting, by the first network device, the network status of the terminal to the detached state.

8. The method according to claim 4, wherein a first size of the first area of the signal coverage area of the first network device is less than or equal to a second size of the second area of the signal coverage area of the first network device.

9. The method according to claim 4, wherein the third time length is a required maximum time length between a first moment at which the first network device instructs the at least one fourth network device to send the paging signaling to the terminal and a second moment at which the at least one fourth network device attempts to receive the paging response.

10. The method according to claim 1, wherein:
the plurality of second network devices in the signal coverage area of the first network device comprises at least one target device; and
the at least one target device has received, before a moment at which the first network device determines that the terminal is in the network out-of-synchronization state, the uplink tracking signal sent by the terminal.

11. The method according to claim 1, wherein instructing, by the first network device, the at least one third network device of the plurality of second network devices to send the paging signaling to the terminal comprises:
when the first network device determines that the terminal is in the network out-of-synchronization state, starting, by the first network device, a first timer, wherein a first timing time length of the first timer is the first time length; and
when the first network device does not receive, before the first timer expires, the measurement message reported by the second network device, instructing, by the first network device, the at least one third network device to send the paging signaling to the terminal.

12. The method according to claim 1, wherein determining that the terminal is in the network out-of-synchronization state comprises:
when the first network device does not receive, in M consecutive periods, the measurement message reported by the second network device, or when the first network device does not receive, in a preset time length, the measurement message reported by the second network device, determining, by the first network device, that the terminal is in the network out-of-synchronization state.

13. A method, comprising:
sending, by a terminal to a first transmission point, an uplink message N consecutive times, wherein the uplink message is uplink data sent on a preset resource when the terminal is in an economic state, or the uplink message is uplink data sent when the terminal is in a connected state, and wherein N is a natural number;
determining, by the terminal, based on the terminal determining that the first transmission point returns no feedback message for the uplink message sent N consecutive times, that the terminal is in a network out-of-synchronization state; and establishing, by the terminal, after determining that the terminal is in the network out-of-synchronization state, a connection to a second transmission point through a random access process.

14. The method according to claim 13, wherein the uplink message is the uplink data sent on the preset resource when the terminal is in the economic state.

15. The method according to claim 13, wherein the uplink message is the uplink data sent when the terminal is in the connected state.

16. The method according to claim 13, wherein:
the first transmission point and the second transmission point are a same transmission point; or
the first transmission point and the second transmission point are different transmission points.

17. An apparatus, comprising:
a transceiver, configured to: when the transceiver does not receive, in a first time length after it is determined that a terminal is in a network out-of-synchronization state, a measurement message reported by a second network device, instruct at least one third network device in a signal coverage area of a first network device to send paging signaling to the terminal, wherein the measurement message is based on an uplink tracking signal of the terminal, and wherein the second network device is in the signal coverage area of the first network device;
a processor; and
a non-transitory computer-readable storage medium storing a program to be executed by the processor, the program including instructions for:
when it is determined that, in a second time length, the at least one third network device has not received a paging response sent by the terminal, and that the terminal is still in the network out-of-synchronization state, setting a network status of the terminal to a detached state, wherein the paging response is a feedback message sent by the terminal in response to the terminal receiving the paging signaling.

18. The apparatus according to claim 17, wherein the program further includes instructions for:
when the measurement message reported by the second network device in the signal coverage area of the first network device is received in the first time length after the terminal is in the network out-of-synchronization state, determining that the terminal has restored a connection to a network.

19. The apparatus according to claim 17, wherein the program further includes instructions for:
when the at least one third network device in the signal coverage area of the first network device has received the paging response in the second time length, setting the network status of the terminal to an attached state after the terminal accesses a network through a random access process.

20. An apparatus, comprising:
a transceiver, configured to send, to a first transmission point, an uplink message N consecutive times, wherein the uplink message is an uplink transmission request sent when the apparatus is in an economic state and determines that data needs to be transmitted, and wherein N is a natural number;
a processor; and
a non-transitory computer-readable storage medium storing a program to be executed by the processor, the program including instructions for:
determining, based on determining that the first transmission point returns no feedback message for the uplink message sent N consecutive times, that a terminal is in a network out-of-synchronization state; and establishing, after the terminal is in the network out-of-synchronization state, a connection to a second transmission point through a random access process.

* * * * *

UNITED STATES PATENT AND TRADEMARK OFFICE
CERTIFICATE OF CORRECTION

PATENT NO. : 10,674,386 B2
APPLICATION NO. : 16/110906
DATED : June 2, 2020
INVENTOR(S) : Yalin Liu et al.

Page 1 of 1

It is certified that error appears in the above-identified patent and that said Letters Patent is hereby corrected as shown below:

On the Title Page

Item (74), Line 1, delete "Matstil" and insert --Matsil--.

Signed and Sealed this
Eighth Day of September, 2020

Andrei Iancu
*Director of the United States Patent and Trademark Office*